US009151959B2

(12) United States Patent
Dike (10) Patent No.: US 9,151,959 B2
(45) Date of Patent: Oct. 6, 2015

(54) METHODS OF FORMING 3D REAL IMAGES FLOATING IN SPACE FROM 3D FLOATING REAL SOURCE IMAGES AND DISPLAY SYSTEMS UTILIZING SUCH METHODS

(75) Inventor: Bruce D. Dike, Gaylordsville, CT (US)

(73) Assignee: PC Mirage, LLC, Baltimore, MD (US)

( * ) Notice: Subject to any disclaimer, the term of this patent is extended or adjusted under 35 U.S.C. 154(b) by 301 days.

(21) Appl. No.: 13/300,716

(22) Filed: Nov. 21, 2011

(65) Prior Publication Data

US 2012/0062846 A1 Mar. 15, 2012

Related U.S. Application Data

(60) Division of application No. 11/774,026, filed on Jul. 6, 2007, now Pat. No. 8,064,137, which is a continuation-in-part of application No. 10/721,128, filed on Nov. 25, 2003, now Pat. No. 7,242,524.

(51) Int. Cl.
*G02B 27/22* (2006.01)
*G02B 27/28* (2006.01)
*G02B 27/01* (2006.01)
*G02B 5/30* (2006.01)

(52) U.S. Cl.
CPC ............ *G02B 27/28* (2013.01); *G02B 27/0101* (2013.01); *G02B 27/2292* (2013.01); *G02B 5/30* (2013.01); *G02B 2027/012* (2013.01); *G02B 2027/0118* (2013.01); *G02B 2027/0121* (2013.01); *G02B 2027/0123* (2013.01)

(58) Field of Classification Search
CPC ........... G02B 27/0101; G02B 27/2292; G02B 2027/0118; G02B 2027/012; G02B 2027/0121
USPC ..................................... 353/10, 28, 69, 70, 77
See application file for complete search history.

(56) References Cited

U.S. PATENT DOCUMENTS 3,940,203 A 2/1976 LaRussa
4,261,657 A * 4/1981 Reiback .......................... 353/10

(Continued)

FOREIGN PATENT DOCUMENTS

EP 0467447 A1 1/1992
EP 0606940 A2 7/1994

(Continued)

OTHER PUBLICATIONS

Martin Schadt, et al., "17A.1: Novel Polarized Liquid-Crystal Color Projection and New TN-LCD Operating Modes" SID 90 Digest, pp. 324-326 (1990).

(Continued)

*Primary Examiner* — Bao-Luan Le
(74) *Attorney, Agent, or Firm* — Downs Rachlin Martin PLLC (57) ABSTRACT

An optical system that projects a real image to a location in free space and includes one or more features located along the optical path that enhance the viewability of the real image. The optical system includes a converging element for converging a portion of source light so as to form the real image. One viewability-enhancing features is the use of a broadband reflector-polarizer having high transmitting and reflecting efficiencies. Another viewability-enhancing features is the use of polarizing elements having substantially matched bandwidth responses and/or comprising an achromatic design. An additional viewability-enhancing feature is the use of a wide-view film to increase the viewing angle of the image.

18 Claims, 4 Drawing Sheets

(56) References Cited

U.S. PATENT DOCUMENTS

| | | | |
|---|---|---|---|
| 4,653,875 A * | 3/1987 | Hines | 359/485.04 |
| 5,311,357 A * | 5/1994 | Summer et al. | 359/479 |
| 5,408,346 A | 4/1995 | Trissel et al. | |
| 5,477,385 A * | 12/1995 | Freeman | 359/629 |
| 5,526,184 A * | 6/1996 | Tokuhashi et al. | 359/630 |
| 5,572,363 A | 11/1996 | Fergason | |
| 5,715,023 A * | 2/1998 | Hoppe | 349/11 |
| 5,782,547 A * | 7/1998 | Machtig et al. | 353/28 |
| 5,853,240 A | 12/1998 | Tanaka et al. | |
| 5,944,403 A * | 8/1999 | Krause | 353/74 |
| 5,975,703 A | 11/1999 | Holman et al. | |
| 6,024,451 A | 2/2000 | DeVaan et al. | |
| 6,042,235 A * | 3/2000 | Machtig et al. | 353/28 |
| 6,055,100 A * | 4/2000 | Kirk | 359/457 |
| 6,100,862 A | 8/2000 | Sullivan | |
| 6,262,841 B1 * | 7/2001 | Dike | 359/485.02 |
| 6,271,969 B1 | 8/2001 | Mertz | |
| 6,318,868 B1 * | 11/2001 | Larussa | 359/857 |
| 6,329,963 B1 | 12/2001 | Chiabrera et al. | |
| 6,364,490 B1 * | 4/2002 | Krause | 353/77 |
| 6,421,183 B1 | 7/2002 | Ophey | |
| 6,497,484 B1 * | 12/2002 | Hoerner et al. | 353/10 |
| 6,767,099 B2 * | 7/2004 | Perkins et al. | 353/10 |
| 6,808,268 B2 * | 10/2004 | Vrachan et al. | 353/10 |
| 6,817,716 B1 * | 11/2004 | Hines | 353/10 |
| 7,242,524 B2 | 7/2007 | Dike | |
| 8,064,137 B2 | 11/2011 | Dike | |
| 2001/0036025 A1 * | 11/2001 | Holden et al. | 359/859 |
| 2001/0048493 A1 | 12/2001 | Swanson | |
| 2002/0012105 A1 * | 1/2002 | Meyers | 353/38 |
| 2002/0126396 A1 * | 9/2002 | Dolgoff | 359/743 |
| 2005/0018309 A1 | 1/2005 | McGuire et al. | |
| 2005/0057812 A1 * | 3/2005 | Raber | 359/619 |

FOREIGN PATENT DOCUMENTS

| | | |
|---|---|---|
| EP | 1690125 A2 | 8/2006 |
| JP | 2002-122806 | 4/2002 |
| JP | 4694501 | 6/2011 |
| TW | 413993 A4 | 3/1986 |
| TW | 093135208 | 6/2005 |
| WO | 2005/052651 A2 | 6/2005 |

OTHER PUBLICATIONS

Official Letter and Search Report dated Nov. 10, 2011 in connection with related TW093135208.

Supplemental European Search Report dated May 29, 2009 in connection with related EP04817885.9 filed Nov. 24, 2004.

Patent Prosecution in connection with USP7,242,524 issued Jul. 10, 2007.

Patent Prosecution in connection with USP8,064,137 issued Nov. 22, 2011.

International Preliminary Report on Patentability dated May 29, 2006 in connection with related PCT/US2004/039461, filed Nov. 24, 2004.

Prosecution of Japanese Patent # 4694501 issued Mar. 4, 2011.

* cited by examiner

METHODS OF FORMING 3D REAL IMAGES FLOATING IN SPACE FROM 3D FLOATING REAL SOURCE IMAGES AND DISPLAY SYSTEMS UTILIZING SUCH METHODS

RELATED APPLICATION DATA

This application is a divisional of U.S. application Ser. No. 11/774,026 filed on Jul. 6, 2007, and titled "Optical System for Forming an Image in Space," now U.S. Pat. No. 8,064,137, which is a continuation-in-part of U.S. patent application Ser. No. 10/721,128 filed on Nov. 25, 2003, and titled "Optical System For Forming An Image In Space," now U.S. Pat. No. 7,242,524 issued Jul. 10, 2007. Each of these applications is incorporated herein by reference in its entirety.

FIELD OF THE INVENTION

The present invention generally relates to the field of optics and, more particularly, to methods of forming 3D real images floating in space and display systems utilizing such methods.

BACKGROUND OF THE INVENTION

Optical systems capable of forming images from illuminated objects find numerous and important applications in areas such as advertising, marketing and product exhibition, as well as other more esoteric functions such as simulation. It is advantageous for such systems to be compact in size, have a wide field of view and high contrast and be viewable in all ambient lighting conditions.

Many real image optical systems, e.g., real image projectors, are designed to create an image wherein the desired image appears against a black background. In a real image projector for, say, gaming applications, a floating, real image of a character is projected into space. The psychological impact of this image is greatest if the game elements appear bright, sharply defined and of high contrast. An example of a current state-of-the-art real image projector of this type is the dual brightness enhancement film (DBEF)-based meniscus-type projecting optical system disclosed in U.S. Pat. No. 6,262,841 to the present inventor and shown in FIG. 1 as optical system 20. However, optical system 20, while of very compact design, has a relatively low efficiency in terms of light throughput and exhibits poor contrast at non-normal, i.e., off-center or oblique, viewing angles.

Figure 1:
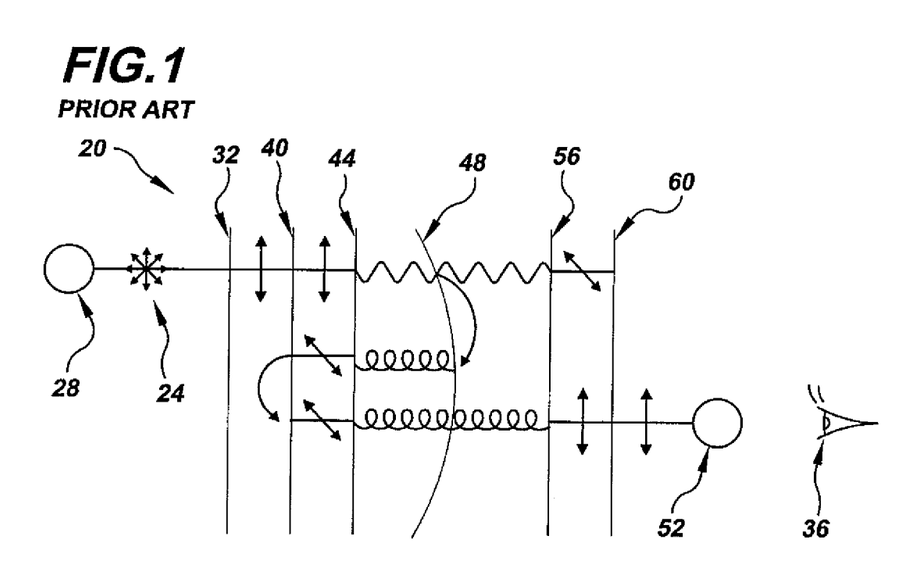
FIG. 1 is a schematic diagram of an existing DBEF-based meniscus-type real image optical system.

Generally, the inclusion of DBEF-based optical system 20 herein serves to illustrate the basic function of a real image optical system, as well as to illuminate the drawbacks of that particular design relative to a real image optical system of the present invention. FIG. 1 shows optical system 20 as including a source light 24 emitted and/or reflected by a source 28. Source light 24 is randomly polarized in nature and is subsequently linearly polarized by a first linear polarizer 32 as it travels toward a viewer 36. This linearly polarized light passes through DBEF 40 having its axis aligned in the transmissive orientation with respect to the linearly polarized light passing through linear polarizer 32. The linearly polarized light that passes through DBEF 40 is circularly polarized by a first quarter wave retarder 44, or first quarter wave plate (QWP). This circularly polarized light (assumed right handed for this description) is then made incident upon a partially mirrored concave (spherical or aspherical) beamsplitter 48. Concave beamsplitter 48 serves to impart the convergence that ultimately forms the real image 52.

The reflected portion of the light has its handedness of circular polarization switched to left handedness by reflection at beamsplitter 48 and is converted to linearly polarized light by first quarter wave retarder 44, as it travels right to left in the figure. This linearly polarized light is largely reflected by DBEF 40, since the direction of linear polarization is opposite the polarization of the initial linearly polarized light. This portion of reflected light is then circularly polarized by first quarter wave retarder 44 as it now travels left to right in the figure. This light is partially reflected and partially transmitted by partially-mirrored concave beamsplitter 48. The transmitted portion is linearly polarized by a second quarter wave retarder 56. A second linear polarizer 60 is aligned such that the linearly polarized light is transmitted to form real image 52 apparent to viewer 36.

The portion of the right circularly polarized light transmitted through partially-mirrored concave beamsplitter 48 is converted to linearly polarized light by second quarter wave retarder 56 in a direction opposite to the polarization direction of the finally transmitted light. As the direction of the light that has passed through second quarter wave retarder 56 is opposite the transmissive direction of second linear polarizer 60, it is extinguished by the second linear polarizer.

Optical system 20 of FIG. 1 utilizes a series of polarizing components, i.e., DBEF 40 and first and second linear polarizers 32, 60 in conjunction with a beamsplitter, i.e., beamsplitter 48, in a compact design that redirects light several times to fold the optical path. This folding of the optical path results in a small device size and superior field of view. However, DBEF 40 and first and second linear polarizers 32, 60 are absorptive in nature and result in losses in terms of light throughput. Additionally, the contrast of the final image is affected, especially at oblique viewing angles, by the differing bandwidth responses among the polarizing elements. The contrast is primarily affected by the existence of undesired bleed-through of a portion of source light 24 resulting from poor extinction ratios of the polarizing elements in off-angle viewing conditions.

In addition to the shortcomings of optical system 20 just mentioned, there are other performance and manufacturing aspects which can be improved. For example, the type of quarter wave retarder used for first and second quarter wave retarders 44, 56 is of a drawn polyvinyl alcohol (PVA) type that characteristically exhibits poor retardance uniformity and has poor performance over time owing to inherent propensity of these types of polarizers to absorb water and thereby alter the retardance value. This lack of uniformity results in poor efficiency of the overall system that primarily manifests itself, again, as greater bleed-through at oblique viewing angles.

Optical system 20 also utilizes a flexible first quarter wave retarder 44 directly adjacent to DBEF 40, which itself is flexible. Since DBEF 40 is used in reflection along the desired light path, it must necessarily be flat to provide a distortion-free reflected image. However, laminating flexible DBEF 40 directly to flexible first quarter wave retarder 56 results in an undulating DBEF surface and, hence, a distorted reflection. The manufacturing complexity of maintaining flatness in flexible DBEF 40 while laminated (or optically coupled) to flexible first quarter wave retarder 44 on one side and first linear polarizer 32 on the other is apparent. Thus, DBEF 40 must be laminated to its own flat glass substrate (not shown) prior to lamination to first quarter wave retarder 44 and additional polarizing and anti-reflective glass elements. This additional step results in optical system 20 including a subassembly having three rigid substrates, including two anti-reflective glass components, along with three sheet-type polarizing elements, resulting in a substantial manufacturing complexity. Regarding DBEF 40 itself, the stand-alone contribution of this element to the overall throughput of the entire system is about 49%, i.e., about 70% reflection and about 70% transmission.

The portion of the right circularly polarized light that is ideally extinguished by second linear polarizer 60 is usually not sufficiently, i.e., "cleanly," polarized to be completely extinguished by this polarizer. Inefficiencies exist, since current PVA-type polarizers are optimized at only a single wavelength, whereas source light 24 for the intended applications, e.g., the applications discussed above, is typically polychromatic. Oblique viewing of real image 52 further tests the limitations of the current quarter wave retarders, since the performance of this type of retarder is highly viewing-angle dependent.

Accordingly, it is desired to obtain a compact meniscus-type real image projector having higher brightness and contrast and better manufacturability than optical system 20, while retaining or improving the superior system size and field of view characteristics of that system. Several improvements for enhancing the image characteristics of optical system of are disclosed herein.

SUMMARY OF THE INVENTION

In one implementation, the present disclosure is directed to a method of forming a 3D real image floating in space. The method includes forming a 3D real floating image at a first location in space; receiving light from the 3D real floating image along an optical axis; projecting, along the optical axis, a first portion of the light to a second location in space spaced from the first location to form the 3D real image floating in space at the second location; and extinguishing a second portion of the light so as to substantially eliminate, from along the optical axis, direct view light from the 3D real floating image.

In another implementation, the present disclosure is directed to a method of displaying a plurality of images to a viewer along an optimal line of sight. The method includes forming a 3D real floating image at a first location in space; receiving light from the 3D real floating image along an optical axis; projecting, along the optical axis, a first portion of the light to a second location in space different from the first location to form a 3D real image floating in space at the second location; extinguishing a second portion of the light so as to substantially eliminate, from along the optical axis, direct view light from the 3D real floating image; and providing a 2D background image that provides, when viewed by the viewer along the optimal line of sight, a background to the 3D real image floating in space.

In still another implementation, the present disclosure is directed to a display system for displaying a plurality of overlaying images to a viewer positioned along an optimal line of sight. The display system includes a 3D-image projector designed and configured to form a 3D real floating image in space at a first location; a projection optic designed and configured to: project a first portion of light from the 3D real floating image, along the optimal line of sight, as a 3D real image floating in space at a second location different from the first location; and extinguish a second portion of the light from the 3D real floating image so as to substantially eliminate, from along the optimal line of sight, direct view light from the 3D real floating image; and a background image source designed and configured to provide a background image to the 3D real image floating in space at the second location when the viewer is located along the optimal line of sight.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

A goal of the present invention is to project a brighter real image into space while improving the off-angle response and manufacturability of real image optical systems, such as the optical system of U.S. Pat. No. 6,262,841 discussed in the background section above in connection with FIG. 1 (optical system 20), using polarizing and reflecting techniques to create a compact imaging system with a wide field of view. Several improvements for enhancing the image characteristics of such optical systems are disclosed. Generally, a basic premise of all three performance enhancements is either achieving greater "cooperation" between the polarizing elements (i.e. better, or "matched," bandwidth response) or improving the losses due to absorption within the polarizing elements, depending upon the enhancement. U.S. Pat. No. 6,262,841 is incorporated by reference herein in its entirety and is referred to below as the "Dike patent."

Known optical system 20 of FIG. 1 utilizes a reflector-polarizer, such as DBEF 40, that reflects one handedness of linear polarization while transmitting the other. The characteristic of differentiating between the two states of polarization is critical when used in a polarizing system such as optical system 20, which relies on the existence of two states such that one state is extinguished or absorbed while the other state is transmitted. Disadvantages of the DBEF-based design of optical system are two-fold.

First, DBEF 40 works on linearly polarized light. The creation of two distinct polarization states of light is possible by the characteristic of the handedness of circularly polarized light being switched via reflection. This reflection occurs at beamsplitter 48 of FIG. 1 and causes the handedness of that portion of the light to be appropriate for reflection upon DBEF 40 and subsequent transmission through adjacent second linear polarizer 60 where it is then viewable as the desired real image 52.

Similarly, source light 24 that might otherwise be viewable directly through optical system 20 without traveling along the "folded" optical path required for the formation of real image 52 is extinguished due to its polarization state being opposite of the polarization state of the desired light. However, inefficiencies exist, since the desired light must be converted from the circularly polarized light required for reflection and polarization reversal at beamsplitter 48 to the linearly polarized light required at DBEF 40. This conversion is accomplished by first quarter wave retarder 44 located between beamsplitter 48 and DBEF 40. The desired light is required to pass through first quarter wave retarder 44 three times along the folded optical path to produce the polarization state appropriate for passage through entire optical system 20. Any deviation in the design value of first quarter wave retarder 44 (usually 140 nm. i.e., one-quarter of 560 nm, the center wavelength of the spectrum of visible light) produced during manufacture or via exposure to degrading ambient conditions is thus amplified by the multiple passes of the desired light through this retarder.

Figure 2A:
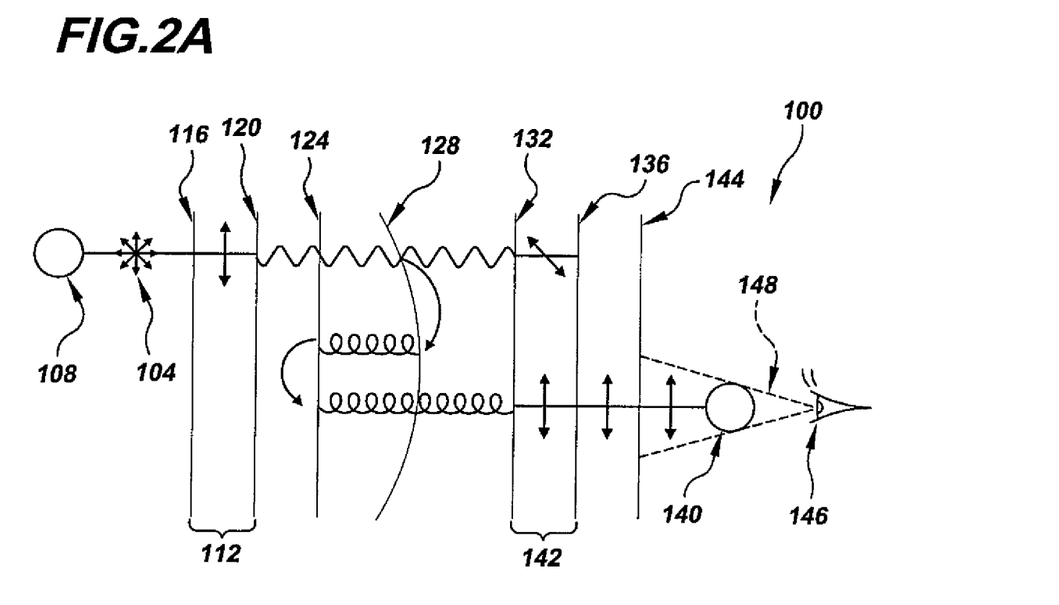
FIG. 2A is a schematic diagram of the meniscus-type real image optical system of the present invention.
Figure 2B:
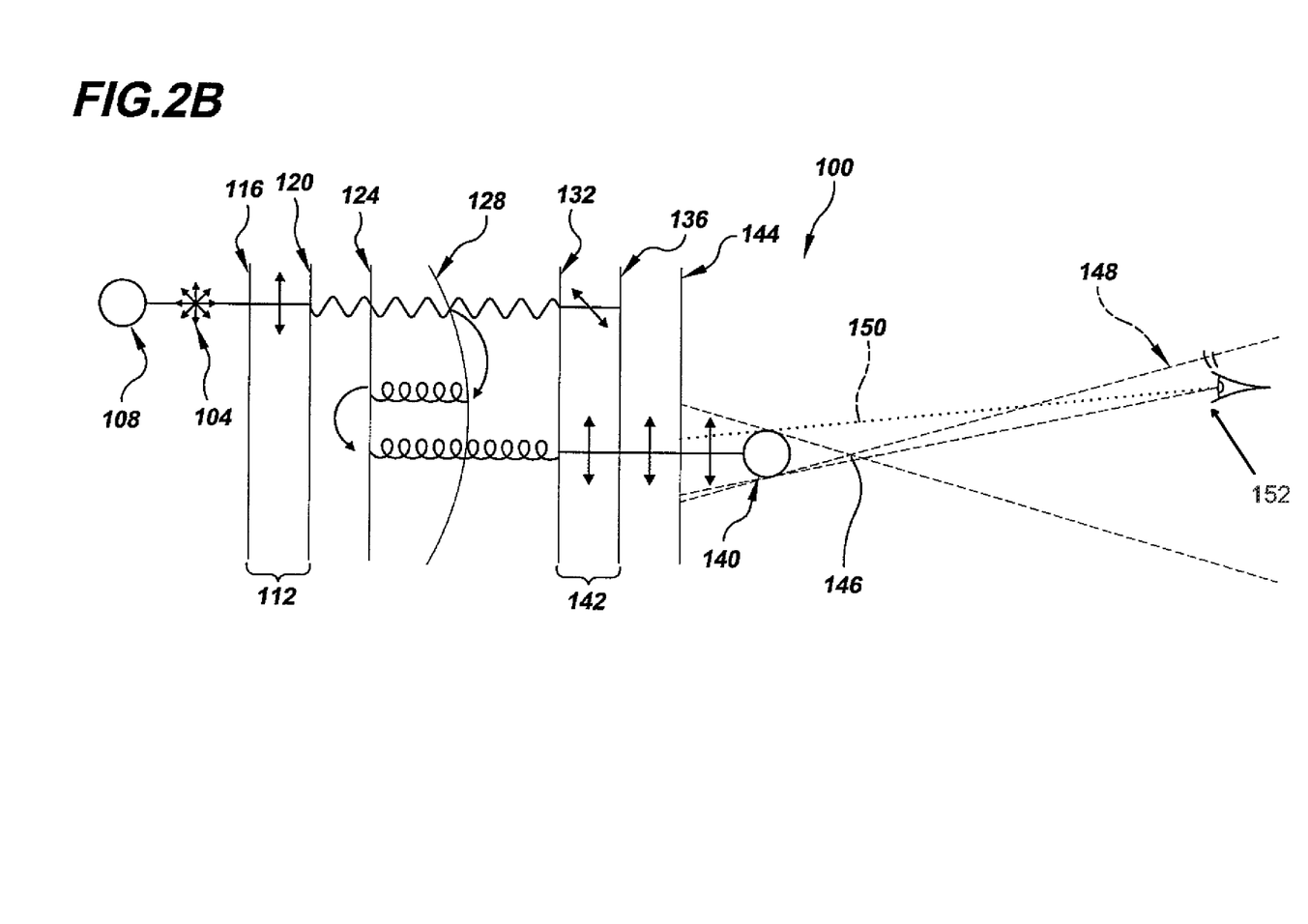
FIG. 2B is a reduced-scale version of the schematic diagram of FIG. 2A illustrating how a viewer can view the entire floating real image from a vantage point different from the vantage point of FIG. 2A.

In order to avoid this performance degrading multiple pass-through situation at first quarter wave retarder 44, a design utilizing a reflector-polarizer having broadband polarizing capability and the properties of reflecting one handedness of circularly polarized light while transmitting the other would be desirable because it could be located immediately adjacent to concave beamsplitter 48. Such a design is illustrated in FIGS. 2A-B, which illustrates a meniscus-type optical system 100 of the present invention. For the purpose of highlighting differences between optical system 100 of the present invention and known meniscus-type optical system 20 of FIG. 1, optical system 100 of FIGS. 2A-B is illustrated as having some elements in common with the optical system of FIG. 1. However, as discussed below, other embodiments utilizing various features of the present invention and different other elements may certainly be made.

Referring to FIGS. 2A-B, a randomly-polarized source light 104 emitted and/or reflected from a source 108 is incident upon a circular polarizer 112 comprising a first linear polarizer 116 and a first quarter wave retarder 120, or first quarter wave plate (QWP), to create circularly polarized light. Then, the light passing through first quarter wave retarder 120 is made incident upon a broadband reflector-polarizer 124. First linear polarizer 116 and first quarter wave retarder 120 are mutually aligned so as to create a circular polarization of source light 104 of an orientation appropriate for transmission through broadband reflector-polarizer 124.

The circularly polarized light is partially reflected by a concave beamsplitter 128 where its handedness of polarization is reversed by this reflection. As the reflected portion now travels from right to left in the figure, it is made incident upon broadband reflector-polarizer 124, from which it is largely reflected since its handedness is opposite the initially transmitted light. The light then travels left to right, passes partially through beamsplitter 128, is converted to linearly polarized light by a second quarter wave retarder 132 and then passes through a second linear polarizer 136 to form desired real image 140. The combination of second quarter wave retarder 132 and second linear polarizer 136 may be considered a direct-view light extinguisher 142, since it acts to substantially extinguish the portion of source light 104, i.e., "direct view" light, transmitted through beamsplitter 128 without having been also reflected by the beamsplitter. Optionally, the light passing through second linear polarizer 136 may be directed through a wide view film 144 provided to enhance off-angle viewability of real image 140. In addition, the combination of broadband reflector-polarizer 124 and beamsplitter 128 may be considered a "folded-path" optic because it reflects incoming light first in the direction opposite from the direction of the incident light and then in the direction of the incident light, thus folding the optical path.

As those skilled in the art will understand, in this example real image 140 is floating in space when viewed from the vantage point 146 illustrated in FIGS. 2A-B (which is also substantially the same as the similar vantage points in FIGS. 1, 3, 5 and 6). Although FIGS. 2A-B (and FIGS. 1 and 3-6 for that matter) are not drawn to any particular scale, they do indeed indicate exemplary relative sizes of the projected floating real image 140 and the projection optic (containing elements 112, 124, 128, 142, 144, especially converging optic 128), as well as the relative locations of the optic, floating image and vantage point 146. For example, those skilled in the art will readily appreciate that for the viewers in FIGS. 2A-B to view the entirety of real image 140, the viewing "cone" 148, which is established by the extremities of the real image as would be perceived by a viewer from vantage point 146, must intersect the optic at every point around the periphery of the cone at the optic. (For convenience the optic is taken as being at wide view film 144 since FIGS. 2A-B represent elements largely functionally rather than physically, except as noted above; however, those skilled in the art will appreciate that the convergence actually begins at the initial reflection by converging optic 128.) In other words, for the viewer at vantage point 146 to view the entirety of real image 140, the entire image must be "backlit" by the optic as viewed from vantage point 146. The closer real image 140 is to the optic the larger the viewing angle at which the entire image can be viewed. Also, the larger the optic, the larger the viewing angle for viewing the entirety of real image 140. Conversely, the more nearly the image size approaches the optic size, the smaller the viewing angle becomes, until when the image and optic are of equal size, the viewing angle is zero, and the eye must be placed at infinity, with a pupil diameter equal to the image size, to see the whole image.

Note that in FIGS. 2A-B, one viewer is show at vantage point 146, implying that viewing cone 148, projected backward through the folded path to converging optic 128, would intersect that optic at its effective periphery. This further implies that the viewer, represented by the eye at vantage point 146 (which is the apex of viewing cone 148), may still view the entire floating image 140 while located anywhere further from the image than point 146, as long as the eye remains within the boundaries of cone 148 as projected forward beyond point 146. This is illustrated in FIG. 2B with a viewing cone 150 that corresponds to the vantage point 152 that is located further from converging optic 128 than vantage point 146. The eye is therefore not restricted to a single location for optimal image viewing as in many other prior art configurations, but may roam freely within the diverging portion of viewing cone 148. Conversely, locating the eye closer to the image than vantage point 146 would still allow part, but not all, of the image to be seen from any given eye position; the eye would need to be moved from place to place in order to see different portions of the image.

Another implication is that the size of real floating image 140 must always be smaller than the converging optic 128, in order for image cone 148 to converge at an eye-accessible vantage point 146. Some prior art avoids this requirement by creating a virtual image instead, thereby abandoning all the advantages of a real floating image which the present invention provides. Other prior art produces a real image but ignores this condition (e.g., slide or movie projectors that create images much larger than the converging optic), thereby abandoning the ability to locate the eye at or beyond a vantage point 146 from which an entire floating image may be observed directly, without the intervention of a diffuse viewing screen which causes the loss of 3D information. A simple example of this distinction may be observed by projecting an image on a screen at relatively high magnification (i.e., with image size larger than the projecting optic), then removing the screen and attempting to view the real image from beyond the screen. The result is that only a very small portion of the focused image (smaller than, or at most equal to, the projecting optic size) is visible from any chosen eye position, and that the eye must be moved to other positions to view different small portions of the image. The larger the magnification of the image, the smaller the portion of the image that a viewer can view from any given viewing location.

Those skilled in the art will also appreciate that depending on the nature of image source 108, real image 140 may be a 2D image or a 3D image. For example, if source 108 is an illuminated object, say a sphere, then real image 140 of the sphere will be perceived by a viewer from vantage point 146 (that is in this example assumed to be located within the stereopsis range of the viewer) to have 3D attributes, including depth. On the other hand, if source 108, for example, is a video display displaying a 2D image, then real image 140 will likewise be a 2D image regardless of whether or not the viewer is within their stereopsis range. As another example, source 108 could be a 3D image projector that itself projects 3D images. For example, U.S. Pat. No. 7,046,447 to Raber discloses a 3D image projector that can create 3D images from a series of 2D "image slices" using any one of a variety of type of electrovariable optics (EVOs) that in rapid succession focus the 2D image slices onto corresponding respective image planes to generate a perceived 3D image. In this case, real image 140 projected into space would be a 3D image of the 3D image created by the EVO projector. U.S. Pat. No. 7,046,447 is incorporated herein by reference to the extent of its teachings of an image projector that could be used for source 108 and sources in FIGS. 3, 5 and 6. Note that the 3D images thereby produced may be directly viewed as floating in space, without the intervention of any viewing screen. Indeed, the interposition of such a screen would require the selection of a particular plane within the 3D image to locate the screen, and the diffuse nature of such a screen would result in an out-of-focus condition for all image information not focused on the screen, and the consequent diffusion and loss of the 3D information contained in the lost information which would otherwise have been focused on a plane other than the plane of the screen.

As in DBEF-based optical system 20 of FIG. 1, the initial portion of polarized source light 104 that transmits through beamsplitter 128 without being reflected back towards source 108 is of a handedness opposite the handedness of the desired reflected light and is therefore extinguished by direct-view light extinguisher 142. Important features of the present invention include: (1) utilizing broadband reflector-polarizer 124 in lieu of DBEF, e.g., DBEF 40 of FIG. 1; (2) including wide view film 144 and (3) matching the frequency response of first and/or second quarter wave retarders 120, 132 to the broadband reflector-polarizer (or DBEF, if the broadband reflector-polarizer is not utilized). Such quarter wave retarders may be achromatic.

Broadband reflector-polarizer 124 can be produced from either chiral or cholesteric liquid crystal (CLC) material. Generally, chiral liquid crystal molecules are not superimposable on their mirror images. Cholesteric liquid crystal molecules are arranged in layers with their long axes parallel in each layer, and with a deliberate displacement in successive layers, thereby producing a helical stacking in thickness. These types of liquid crystal polarizers can exhibit properties desirable for the contemplated imaging application due to a macroscopic helical structure, whose axes are perpendicular to the observation plane, that can be imparted into the liquid crystals of this type of polarizer. Polarizing elements of this type include cholesteric structure having a varying helical pitch distributed across the thickness of the element, thereby imparting a broadband response appropriate for incorporation in a real-image optical system such as optical system 100 of FIGS. 2A-B and optical systems described below, among others. This type of CLC structure is known as a "gradient pitch" CLC. Such gradient pitch CLCs are currently manufactured by Chelix of Sunnyvale, Calif. Rolic Technologies, Ltd. of Switzerland has a similar broadband component that utilizes individually applied layers of liquid crystal material each having a pitch characteristic intended to respond to a different wavelength range of light. Similarly, Philip Research of Eindhoven, the Netherlands, has developed material that uses a "deformed" helical structure to achieve broadband response.

In addition to the immediate advantage of working directly on the circularly polarized light and eliminating quarter wave retarder 44 (FIG. 1) that would otherwise be needed adjacent to DBEF 40, broadband reflector-polarizer CLCs are largely non-absorptive, allowing for greater overall efficiencies than DBEF. The new CLCs can have close to 100% transmissibility for one handedness of circularly polarized light and close to 90% reflectivity of the other. Thus, broadband reflector-polarizer 124 offers a "stand alone" contribution to the overall system throughput of about 90%. By contrast, DBEF has efficiency of closer to 70% for each reflectivity and transmissibility, resulting in a contribution to the overall system throughput of about 49%. Additionally, current data supports the probability of achieving higher contrast, or more "cleanly" polarized light, than is currently possible with DBEF. A CLC polarizing material is a polymer and may be applied directly to a substrate (e.g., glass) to ensure good flatness and substantially no distortion in the final image originating from laminating to adjacent, non-rigid, polarizers. Consequently, such a broadband reflector-polarizer may be located at the outside of the laminated series of polarizing elements and glass such that its flatness is ensured without the need for additional substrates and an accompanying manufacturing complexity.

Broadband reflector-polarizer 124 may also be located adjacent to beamsplitter 128 such that no accompanying polarizers contribute to polarizing inefficiencies and poor final image quality. This is especially significant at this location since any other transmissive element located there, such as first quarter wave retarder 44 in DBEF-based optical system 20 of FIG. 1, effectively appears three times on the unfolded optical path.

It is noted that CLC polarizers have the characteristic of creating two handednesses of circularly polarized light from randomly polarized, incident light. Thus, it is possible to exclude first linear polarizer 116 and first quarter wave retarder 120 when broadband reflector-polarizer 124 is a CLC polarizer so as to achieve a simpler system with substantially fewer elements than shown in FIGS. 2A-B. However, the inclusion of first linear polarizer 116 and first quarter wave retarder 120 serve to more cleanly polarize source light 104 so as to increase contrast. Development of the other elements of optical system 100 and realization of better cooperation of all of the polarizers utilized, in terms of bandwidth response, may result in the exclusion of first linear polarizer 116 and first quarter wave retarder 120.

The addition of wide-view film 144 can improve the off-angle viewability and contrast of optical system 100 relative to conventional real image projecting optical systems, such as optical system 20 of FIG. 1. As discussed in the background section above, the birefringence of the polarizing elements of optical system 20 leads to angularly-dependent light transmission. Compensation films currently developed for LCDs offer the ability to improve the quality of real image and are therefore suitable for use as wide-view film 144. In addition, films such as the wide-view film (WVF) available from Fuji Photo Film, Inc., Greenwood S.C. and Rolic's Photo-Aligned LC-Polymer film are also suitable for use as wide-view film 144. It is recognized that there are many "wide-view films" or compensating technologies that may achieve the desired effect in the contemplated applications. Implementation of these techniques may require the addition of a component, 144, or different components at other, perhaps multiple, locations in the configuration. An important aspect of the inclusion of wide-view film 144 is that its function and performance enhancement contribution to the final image is independent of the system type, be it broadband reflector-polarizer-based or DBEF-based.

An additional area of improvement over the current generation of DBEF-based real image display optical systems is the incorporation of "matched" first and second quarter wave retarders 120, 132 that cooperate more advantageously with the bandwidth response of the other polarizing elements (specifically, either the broadband reflector-polarizer of the present invention or the DBEF of a conventional DBEF-based optical systems. Inefficiencies that lead to a dimmer image and greater bleed-through or contrast degradation result when the different polarizing elements respond to different wavelengths with different efficiencies. Obvious sources for this type of error are the quarter wave retarders, e.g., first and second quarter wave retarders 44, 56 of optical system 20 of FIG. 1, the design wavelength of which is simply centered in the visible spectrum, i.e., at 560 nm. Thus, such quarter wave retarders have decreasing efficiency at wavelengths higher and lower than 560 nm. These inefficiencies manifest themselves primarily as increased bleed-through (or decreased contrast) in the final image, especially at oblique viewing angles.

Certain materials have superior performance and can be used in the quarter wave retarders, e.g., first and second quarter wave retarders 44, 56 of FIG. 1 and first and second quarter wave retarders 120, 132 of FIGS. 2A-B, to improve the overall image quality of the corresponding optical system, e.g., optical systems 20, 100 respectively. Achromatic quarter wave retarders comprising liquid crystal polymers (LCPs) in a stacked configuration that may be photo aligned, such as those produced by Rolic, have been found to exhibit superior performance, especially with respect to off-angle viewing characteristics. The bandwidth response of this quarter wave retarder may also be matched to the bandwidth characteristics of the DBEF or broadband reflector-polarizer and the type of light source (e.g., LCD) for improved efficiency and a superior image.

Figure 3:
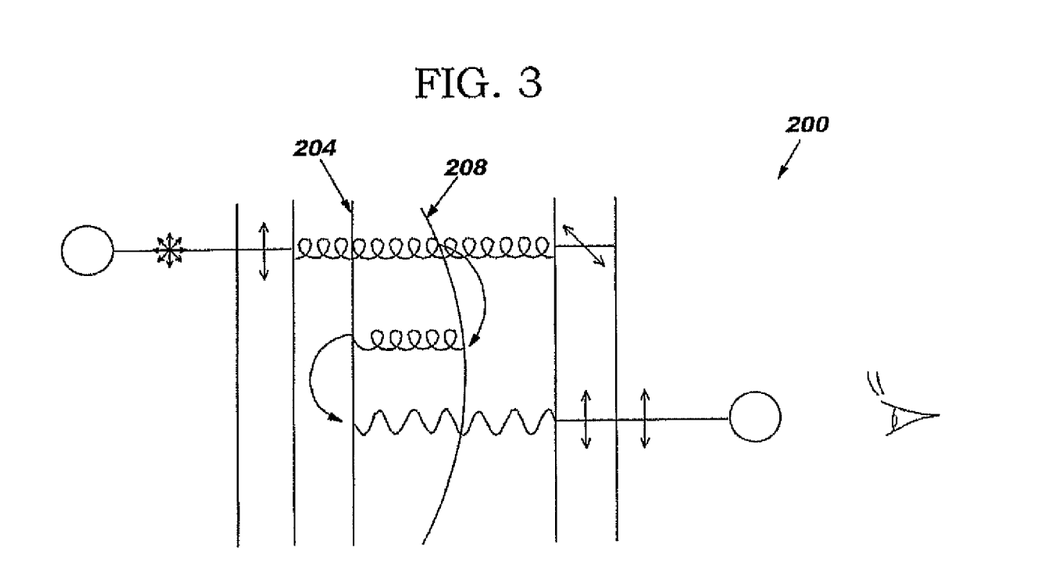
FIG. 3 is a schematic diagram of an alternative meniscus-type real image optical system of the present invention.

FIG. 3 shows an alternative meniscus-type optical system 200 of the present invention. Optical system 200 is designed with recognition that the performance of polarizing elements, e.g., broadband reflector-polarizer 124 of FIGS. 2A-B, is dependent upon the viewing angle. As described above, such dependence can result in contrast loss and color shift when real image 140 is viewed obliquely. Thus, it may be advantageous to arrange the broadband reflector-polarizer in an optical system in such a manner that the surface of the broadband reflector-polarizer is mostly normal to a viewer as the viewing position moves to the left or right of the on-axis, or normal, position. Relative to optical system 100 of FIGS. 2A-B, this goal may be accomplished by reversing the function of flat broadband reflector-polarizer 124 and concave beamsplitter 128, such as shown in FIG. 3 wherein optical system 200 contains a flat beamsplitter 204 and concave broadband reflector-polarizer 208 that make up the folded-path optic. This modification results in identical optical mechanisms with respect to the use of different polarization states within optical system 200 to achieve good ambient reflection attenuation and elimination of direct viewing of source light.

Figure 4:
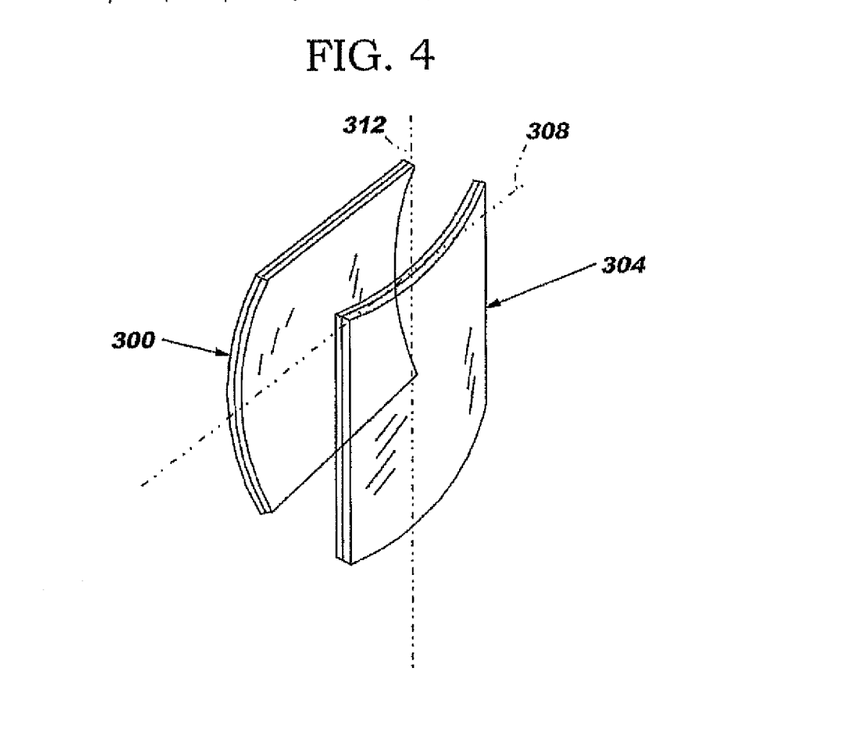
FIG. 4 is a schematic diagram of a cylindrical analog of the reflective elements of the optical systems of FIGS. 2A-B and 3 that may be used in each of these systems.

In variations of meniscus-type optical systems of the present invention, such as optical systems 100, 200 of FIGS. 2A-B and 3, respectively, the reflective elements in each, i.e., concave beamsplitter 128 and flat broadband reflector-polarizer 124 of FIGS. 2A-B and flat beamsplitter 204 and concave broadband reflector-polarizer 208 of FIG. 3, may be replaced by a pair of opposing cylindrical elements, e.g., cylindrical elements 300, 304 of FIG. 4, having their axes of curvature 308, 312 orthogonal to one another. The properties and reasons for using opposing cylindrical elements 300, 304 in lieu of a corresponding spherical element are discussed in U.S. Pat. No. 4,653,875 to Hines, which is incorporated herein in its entirety. In such an arrangement, one cylindrical element, e.g., concave element 300, may be coated with a conventional beamsplitter coating and the other cylindrical element, e.g., cylindrical element 304, may comprise a broadband reflector-polarizer element.

This design has two benefits. First, cylindrical broadband reflector-polarizer 304 can be positioned such that its curvature axis 312 is oriented for achieving the best viewing-angle performance. Second, there is a potential manufacturing improvement since the two cylindrical elements 300, 304 can be of a thin, flexible composition such that the desired curvature can be obtained by bending the laminations around a frame as described in the Hines patent. This eliminates the relatively expensive meniscus elements of FIGS. 2A-B and 3, i.e., concave beamsplitter 128 (FIGS. 2A-B) and concave broadband reflector-polarizer 208 (FIG. 3).

Figure 5:
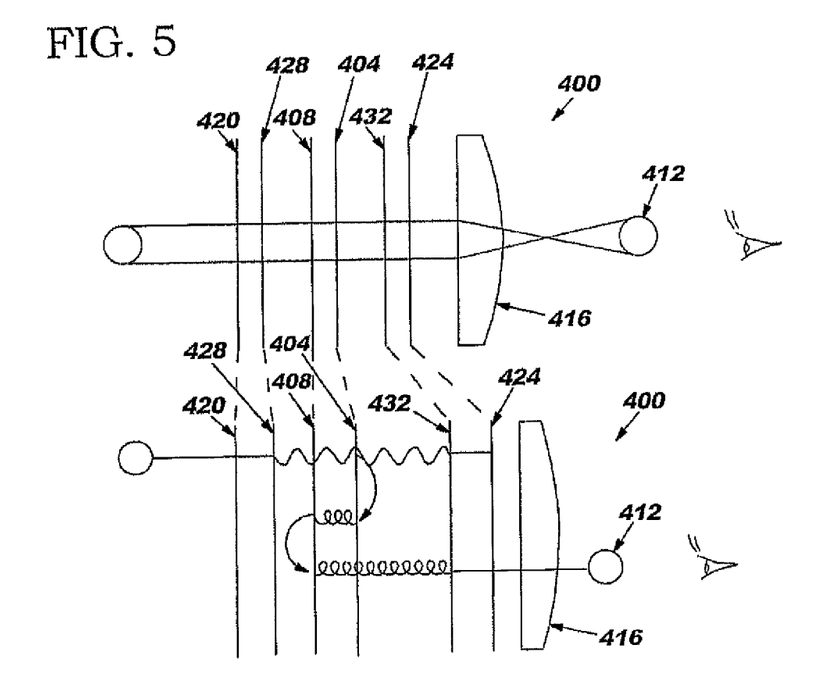
FIG. 5 is a schematic diagram of a lens-type real image optical system of the present invention.

FIG. 5 illustrates another embodiment of an optical system 400 of the present invention. Optical system 400 differs from optical systems 100, 200 of FIGS. 2A-B and 3 in that it utilizes a folded-path optic that includes a flat beamsplitter 404 and a flat broadband reflector-polarizer 408, rather than having one or the other (or both in the variation discussed in connection with FIG. 4) of these elements curved. Consequently, the convergence power needed to display a real image 412 is provided by one or more lenses, such as lens 416, that may be located as shown in FIG. 5. Those skilled in the art will readily appreciate that lens 416 may located otherwise, such as between beamsplitter 404 and broadband reflector-polarizer 408. Also apparent is the use of a lens as described above in combination with additional lenses or concave reflective elements to achieve image 412. Other possible variations of systems include variations similar to the optical systems shown in FIGS. 4-6 of the Dike patent.

Regardless of where lens 416 is located within optical system 400, the arrangement of the other elements, e.g., first and second linear polarizers 420, 424 and first and second quarter wave retarders 428, 432, and the polarization states of the light along the optical path may be identical to the arrangement of the corresponding elements and polarization states already described in connection with FIGS. 2A-B and 3. The difference may only by the use of one or more lenses 416 in lieu of one or more concave elements to achieve the convergence that forms real image 412. In an embodiment wherein lens 416 is located at either the source or viewer side of optical system 400, a performance improvement over a simple source/lens system is achieved as either the image or source side (in a real image creating optical system) of the optical path is effectively folded three times by the reflection and re-reflection of the desired light between the reflective beamsplitter, e.g., beamsplitter 404, and broadband reflector-polarizer, e.g., broadband reflector-polarizer 408. This can result in a device containing a folded optical path being more compact than a device containing a simple source/lens image system wherein the optical path is not compressed (folded) in such manner. Similarly, if lens 416 is located between beamsplitter 404 and broadband reflector-polarizer 408, a similar folded optical path advantage is created while the optical power of the lens is amplified by multiple passages through the lens. Such lens-based variations can result in decreased manufacturing costs as the reflective elements, i.e., beamsplitter 404 and broadband reflector-polarizer 408, are flat, while the additional lens 416 can be of a conventional or Fresnel design.

Figure 6:
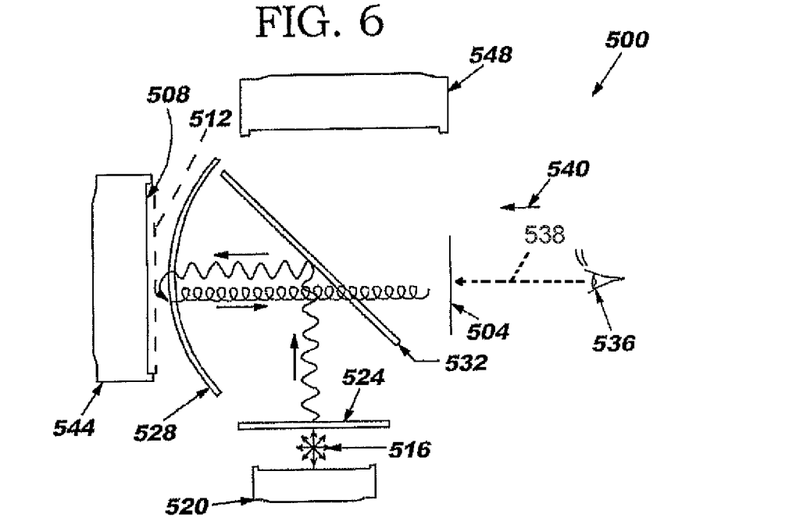
FIG. 6 is a schematic diagram of a real image optical system of the present invention having one or more secondary sources for forming one or more secondary images in conjunction with primary image.

FIG. 6 shows an embodiment of an optical system 500 of the present invention that can produce a floating real image 504 and one or more background images 508, 512 viewable behind the floating image. Generally, optical system 500 is arranged so as to eliminate a direct view of source light 516 from a primary source 520 by locating the source away from the viewing axis as well as by a crossed polarizer mechanism. Randomly polarized source light 516 is circularly polarized via a circular polarizer 524, e.g., a linear polarizer/quarter wave retarder combination. This circularly polarized light is reflected toward a concave element 528 via an obliquely placed broadband reflector-polarizer 532. Broadband reflector-polarizer 532 is oriented such that maximum reflection and minimum transmission of source light is achieved. The now leftward (relative to FIG. 6) traveling circularly polarized light is then incident upon concave element 528, where the handedness of circular polarization is reversed by reflection. Concave element 528 imparts the convergence that ultimately forms floating real image 504. The rightward traveling light is now of a handedness appropriate for transmission through broadband reflector-polarizer 532, after which it then forms floating real image 504 viewable to a viewer 536 when viewed along an optimal line of sight 538. When viewed along optimal line of sight 538, the viewer will typically see the entirety of floating real image 504 because of the "backlighting" provided by the relative large size of the optic, i.e., concave partially reflecting element 528, compared with the floating real image. Those skilled in the art will readily appreciate that, depending on the size of the optic (concave element 528), floating real image 104 may be viewable in its entirety at off-axis angles relative to optimal line of sight 538.

Real, or floating, images can be created conventionally by implementing readily-available beamsplitting and concave reflecting elements in an arrangement similar to the arrangement shown in FIG. 6. However, such elements are non-discriminating with respect to the polarization of the light and as such have substantial losses at the obliquely placed beamsplitter whose stand-alone contribution to the throughput of the entire system can be at best 25% (50% reflection followed by 50% transmission of that remaining portion of light). This scenario can be improved upon by implementing a DBEF-based design as disclosed in the Dike patent, e.g., in FIG. 9 thereof, wherein a quarter wave retarder (element 30 in FIG. 9 of the Dike patent) is required in front of the concave element. Optical system 500 of FIG. 6, and particularly the implementation of broadband reflector-polarizer 532 offers an additional efficiency improvement while eliminating at least one laminated polarizing element relative to a DBEF-based design.

Conventional non-polarizing elements utilized in previous designs also have the disadvantage of allowing ambient light sources from the viewing environment to be reflected from the concave element, thereby creating a competing light source image along with the desired image. Such ambient reflections result in a confusing image with low contrast. With respect to this ambient reflection detriment, the broadband reflector-polarizer-based design of optical system 500 of the present invention first circularly polarizes incoming ambient light 540 and then reverses the handedness of that polarization upon reflection from concave element 528. This "returning" light is then of a polarization state appropriate for reflection at broadband reflector-polarizer 532, which redirects the returning light away from viewer 536 such that floating image 504 is viewable without competing, contrast degrading, ambient light reflections. This mechanism is similar to a conventional circular polarizing anti-glare filter available for conventional video displays used in bright ambient conditions (aircraft cockpit displays are a common application). These filters first circularly polarize ambient light, reverse the handedness at reflection upon the surface of the display itself and then absorb that light upon exiting the system. A distinction relative to optical system 500 is that these filters absorb ambient light as in a crossed-polarizer scenario, while the ambient light controlling mechanism of the broadband reflector-polarizer-based design of optical system 500 simply reflects the ambient light away from viewer 536.

Additionally, conventional optical systems using non-polarizing elements allow a viewer to see the image source directly by looking downward into the devices containing the systems, wherein the image source is readily viewable though the transmissive beamsplitter. In optical system 500 of FIG. 6, however, it is possible to use the polarizing elements to largely eliminate exiting light when one attempts to view primary source 520 directly in the manner just described. In optical system 500, broadband reflector-polarizer 532 combines with the circular polarizer 524 to function in a crossed-polarizer scenario to extinguish (or, more accurately, to redirect away from viewer 536) source light 516 which might otherwise exit optical system 500 so as to be viewable from outside the system.

An additional benefit of the broadband reflector-polarizer-based design of optical ambient reflection and the direct source light viewability detriments of non-polarizing designs system 500 can be illustrated by comparison to conventional, non-polarizing, designs. Both the can be partially corrected by varying the geometry of the beamsplitter/concave reflector combination. Such a variation can be made so as to redirect ambient reflections downward below the viewing axis by angling concave element 528 downward. This has the additional benefit of allowing the vertical source light axis to be rotated counterclockwise (when the conventional system is oriented with a viewer to the right in a manner similar to optical system 500 of FIG. 6), which moves the primary image source closer to the "front" of the display, thereby making the source more difficult to view when looking downward into the display. A drawback of this design, however, is that the off-axis nature of the concave imaging element relative to the source due to varying the geometry of the beamsplitter/concave reflector combination results in a geometrically confusing image with very poor vertical symmetry, among other optical defects. These distortions are greatly amplified when viewed from the right or left of the system. The broadband reflector-polarizer-based design of optical system 500 allows a designer to maintain an on-axis arrangement of the imaging optic, i.e., concave element 528, and source illumination to creates a symmetrical and relatively distortion-free image.

Concave element 528 can be either a fully-reflective element or a partially-reflective beamsplitting element. In the later case, the partially transmissive nature of concave element 528 allows for the placement of a background source 544 viewable in a direct manner through concave (beamsplitting) element 528 and broadband reflector-polarizer 532. An additional background image 508 can be formed by the placement of an additional background source 548 above broadband reflector-polarizer 532 such that an image reflected from this additional source is apparent behind floating real image 504. The result of this variation is that either first or second background image 508, 512 will be visible at the "rear" of optical system 500. Variation in the placement of either background source 544 or background source 548 can result in varying locations of background images 508, 512 relative to floating real image 504. Concave element 528 can be of a focal length appropriate to create real image 504 that appears to float at some distance in front of optical system 500, or it could be of a longer focal length to create a virtual image that appears at infinity, as in a flight simulator, or at some intermediate finite distance.

While the present invention has been described in connection with certain preferred embodiments, it will be understood that it is not so limited. On the contrary, it is intended to cover all alternatives, modifications and equivalents as may be included within the spirit and scope of the invention as defined above and in the claims appended hereto.

What is claimed is:

1. A method of forming a 3D real image floating in space, comprising:
    forming a 3D real floating image at a first location in space;
    receiving light from the 3D real floating image along an optical axis;
    projecting, along the optical axis, a first portion of the light to a second location in space spaced from the first location to form the 3D real image floating in space at the second location, wherein said projecting includes:
        circularly polarizing the light to create circularly polarized light;
        reflecting the circularly polarized light using a chiral- or cholesteric-liquid-crystal-based broadband reflector-polarizer; and
        following said reflecting, converting the circularly polarized light to linearly polarized light to create the first portion of the light; and
    extinguishing a second portion of the light so as to substantially eliminate, from along the optical axis, direct view light from the 3D real floating image.

2. A method according to claim 1, wherein said forming the 3D real floating image includes projecting individual slices of the 3D real floating image so that the individual slices combine to form the 3D real floating image.

3. A method according to claim 2, wherein said projecting the individual slices includes projecting the individual slices using an electrovariable optic that focuses the individual slices onto corresponding respective spaced image planes at the first location so as to form the 3D real floating image.

4. A method according to claim 1, wherein the circularly polarized light has a first handedness and is composed of the first portion and the second portion, said projecting the first portion of the light and said extinguishing said second portion of the light including:
    receiving the light from the 3D real floating image from a first direction along the optical axis;
    bouncing the first portion of the circularly polarized light between the chiral- or cholesteric-liquid-crystal-based broadband reflector-polarizer and a partially mirrored reflector along the optical axis so that the first portion has a second handedness opposite the first handedness and is directed along the optical axis in a second direction opposite the first direction;
    passing the second portion of the circularly polarized light through the chiral- or cholesteric-liquid-crystal-based broadband reflector-polarizer and the partially mirrored reflector along the optical axis so that the second portion retains the first handedness;
    after said passing of the second portion of the circularly polarized light, extinguishing the second portion of the circularly polarized light; and
    focusing the first portion of the circularly polarized light to a location in space so as to form the 3D real image floating in space at the second location.

5. A method according to claim 4, wherein said focusing of the first portion of the circularly polarized light includes focusing the first portion of the circularly polarized light along the optical axis in the second direction.

6. A method according to claim 4, wherein said focusing of the first portion of the circularly polarized light includes focusing the first portion of the circularly polarized light with the broadband reflector-polarizer.

7. A method according to claim 4, wherein said focusing of the first portion of the circularly polarized light includes focusing the first portion of the circularly polarized light with the partially mirrored reflector.

8. A method according to claim 4, wherein said focusing of the first portion of the circularly polarized light includes focusing the first portion of the circularly polarized light with a refractive lens.

9. A method of displaying a plurality of images to a viewer along an optimal line of sight, comprising:
    forming, using a first source, a 3D real floating image at a first location in space;
    receiving light from the 3D real floating image along an optical axis;
    projecting, along the optical axis, a first portion of the light to a second location in space different from the first location to form a 3D real image floating in space at the second location;
    extinguishing a second portion of the light so as to substantially eliminate, from along the optical axis, direct view light from the 3D real floating image; and
    providing, using a second source different from the first source, a 2D background image that provides, when viewed by the viewer along the optimal line of sight, a background to the 3D real image floating in space
    circularly polarizing the light of the 3D real floating image so as to create circularly polarized light of a handedness;
    reflecting the circularly polarized light obliquely off of a broadband reflector-polarizer comprising either a chiral or cholesteric liquid crystal material so as to create reflected circularly polarized light directed to a converging reflector;
    reflecting the reflected circularly polarized light from the converging reflector so as to:
    reverse the handedness of the reflected circularly polarized light to created reverse-handed reflected circularly polarized light;
    pass the reverse-handed reflected circularly polarized light through the broadband reflector-polarizer; and
    focus the reverse-handed reflected circularly polarized light beyond the broadband reflector-polarizer along the optimal line of sight so as to form the 3D real image of the entirety of the 3D real floating image.

10. A method according to claim 9, wherein said forming the 3D real floating image includes projecting individual slices of the 3D real floating image so that the individual slices combine to form the 3D real floating image.

11. A method according to claim 10, wherein said projecting the individual slices includes projecting the individual slices using an electrovariable optic that focuses the individual slices onto corresponding respective image planes at the first location so as to form the 3D real floating image.

12. A method according to claim 9, wherein the converging reflector is a partially mirrored reflector and said providing of the background image includes providing a second image so that it is viewed from the optimal line of sight through the broadband polarizer-reflector and the partially mirrored reflector.

13. A method according to claim 9, wherein said providing of the background image includes providing the background image so that it is viewed from the optimal line of sight as a reflection off of the broadband reflector-polarizer.

14. A display system for displaying a plurality of overlaying images to a viewer positioned along an optimal line of sight, comprising:
   a 3D-image projector designed and configured to form, using a first source, a 3D real floating image in space at a first location;
   a projection optic designed and configured to:
   project a first portion of light from the 3D real floating image, along the optimal line of sight, as a 3D real image floating in space at a second location different from the first location; and extinguish a second portion of the light from the 3D real floating image so as to substantially eliminate, from along the optimal line of sight, direct view light from the 3D real floating image; and
   a background image produced using a second source different from the first source, the second source designed and configured to provide a background image to the 3D real image floating in space at the second location when the viewer is located along the optimal line of sight;
   wherein the 3D real floating image is composed of randomly polarized light and said projection optic comprises:
   a first optical path extending from the 3D real floating image;
   a circular polarizer located along said first optical path for polarizing the randomly polarized light so as to created circularly polarized light having a handedness;
   a converging element located along said first optical path for focusing a portion of the circularly polarized light to the second location so as to create the 3D real image floating in space at the second location, said converging element reversing the handedness of the circularly polarized light so as to create reversed-handed circularly polarized light; and
   a broadband reflector-polarizer comprising either a chiral or cholesteric liquid crystal material positioned along said first optical path obliquely relative to each of said circular polarizer and said converging element so as to reflect the portion of the circularly polarized light to said converging element, wherein said converging element is positioned relative to said broadband reflector-polarizer so that the reverse-handed circularly polarized light is reflected through said broadband reflector-polarizer from said converging element in forming the 3D real image floating in space at the second location.

15. A display system according to claim 14, wherein the 3D real floating image is composed of 2D image slices and said 3D-image projector is designed and configured to project the 2D image slices onto corresponding respective image planes at the first location so as to form the 3D real floating image.

16. A display system according to claim 14, wherein said 3D-image projector comprising an electrovariable optic that changes focus so as to successively focus the 2D image slices onto the corresponding respective images planes.

17. A display system according to claim 14, wherein said background image source is positioned to provide said background image via reflection from said broadband reflector-polarizer.

18. A display system according to claim 14, wherein said background image source is positioned to provide said background image via transmission through each of said converging element and said broadband reflector-polarizer.

* * * * *